(12) United States Patent
Chouhan et al.

(10) Patent No.: US 10,001,019 B2
(45) Date of Patent: Jun. 19, 2018

(54) TURBINE ROTOR BLADE

(71) Applicant: General Electric Company, Schenectady, NY (US)

(72) Inventors: Rohit Chouhan, Karnataka (IN); Shashwat Swami Jaiswal, Karnataka (IN)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 14/638,531

(22) Filed: Mar. 4, 2015

(65) Prior Publication Data
US 2016/0258301 A1  Sep. 8, 2016

(51) Int. Cl.
*F01D 5/20* (2006.01)
*F01D 5/18* (2006.01)
*F02C 3/04* (2006.01)

(52) U.S. Cl.
CPC ............... *F01D 5/20* (2013.01); *F01D 5/18* (2013.01); *F02C 3/04* (2013.01); *F05D 2220/32* (2013.01); *F05D 2240/307* (2013.01); *F05D 2240/35* (2013.01); *F05D 2250/121* (2013.01); *F05D 2250/141* (2013.01); *F05D 2260/20* (2013.01)

(58) Field of Classification Search
CPC .................................. F01D 5/20; F01D 11/08
USPC ........................................................ 415/173.1
See application file for complete search history.

(56) References Cited

U.S. PATENT DOCUMENTS

| 4,761,116 A * | 8/1988 | Braddy ................ F01D 5/20 415/115 |
| 6,527,514 B2 * | 3/2003 | Roeloffs ............ F01D 5/186 416/97 R |
| 7,704,047 B2 | 4/2010 | Liang et al. |
| 8,616,850 B2 * | 12/2013 | Ward ................... F01D 5/3007 416/204 A |
| 8,801,377 B1 | 8/2014 | Liang |
| 9,255,481 B2 * | 2/2016 | Lim ..................... F01D 5/145 |
| 9,273,561 B2 * | 3/2016 | Lacy .................... F01D 5/186 |
| 2013/0142651 A1 | 6/2013 | Lim |

OTHER PUBLICATIONS

European Search Report regarding Application No. 16158102.0-1610 dated Jul. 25, 2016.

* cited by examiner

*Primary Examiner* — Logan Kraft
*Assistant Examiner* — Jason Fountain
(74) *Attorney, Agent, or Firm* — Ernest G. Cusick; Frank A. Landgraff

(57) ABSTRACT

A turbine rotor blade includes a tip portion having a pressure tip wall and a suction tip wall, a tip leading edge and a tip trailing edge. Also included is a squealer cavity at least partially defined by the pressure tip wall and the suction tip wall. Further included is at least one hole defined by the suction tip wall, the at least one hole configured to bleed a cooling flow out of the squealer cavity into a hot gas path to reduce pressure within the squealer cavity. Yet further included is a main body having a suction side wall and a pressure side wall each extending from a root portion of the turbine rotor blade to the tip portion.

18 Claims, 5 Drawing Sheets

TURBINE ROTOR BLADE

BACKGROUND OF THE INVENTION

The subject matter disclosed herein relates to turbine systems and, more particularly, to a turbine rotor blade with enhanced cooling of a tip portion thereof.

In a gas turbine engine, air pressurized in a compressor is used to combust a fuel in a combustor to generate a flow of hot combustion gases, whereupon such gases flow downstream through one or more turbines so that energy can be extracted therefrom. In accordance with such a turbine, generally, rows of circumferentially spaced turbine rotor blades extend radially outwardly from a supporting rotor disk. Each blade typically includes a dovetail that permits assembly and disassembly of the blade in a corresponding dovetail slot in the rotor disk, as well as an airfoil that extends radially outwardly from the dovetail and interacts with the flow of the working fluid through the engine.

The airfoil has a generally concave pressure side and generally convex suction side extending axially between corresponding leading and trailing edges and radially between a root and a tip. Because turbine blades are bathed in hot combustion gases, effective cooling is required for ensuring a useful part life. Typically, the blade airfoils are hollow and disposed in flow communication with the compressor so that a portion of pressurized air bled therefrom is received for use in cooling the airfoils. Airfoil cooling is quite sophisticated and may be employed using various forms of internal cooling channels and features. Nevertheless, airfoil tips are particularly difficult to cool since they are located directly adjacent to the turbine shroud and are heated by the hot combustion gases that flow through the tip gap. Accordingly, a portion of the air channeled inside the airfoil of the blade is typically discharged through the tip for the cooling thereof.

Tip portions of blades often include a pocket that the cooling air is discharged to. A fillet portion is often included at the tip to strengthen tip leakage vortices in the region to reduce leakage flow. Cooling these fillets requires a high supply pressure of cooling flow, thereby reducing overall system efficiency.

BRIEF DESCRIPTION OF THE INVENTION

According to one aspect of the invention, a turbine rotor blade includes a tip portion having a pressure tip wall and a suction tip wall, a tip leading edge and a tip trailing edge. Also included is a squealer cavity at least partially defined by the pressure tip wall and the suction tip wall. Further included is at least one hole defined by the suction tip wall, the at least one hole configured to bleed a cooling flow out of the squealer cavity into a hot gas path to reduce pressure within the squealer cavity. Yet further included is a main body having a suction side wall and a pressure side wall each extending from a root portion of the turbine rotor blade to the tip portion.

According to another aspect of the invention, a turbine section of a turbine system includes a plurality of turbine rotor blades forming a plurality of turbine stages, wherein each of the plurality of turbine rotor blades includes a main body having a leading edge, a trailing edge, a suction side wall and a pressure side wall. Also included is a tip portion of at least one of the plurality of turbine rotor blades having a pressure tip wall and a suction tip wall, a tip leading edge and a tip trailing edge. Further included is a squealer cavity at least partially defined by the pressure tip wall and the suction tip wall. Yet further included is at least one hole defined by the suction tip wall, the at least one hole configured to bleed a cooling flow out of the squealer cavity into a hot gas path to reduce pressure within the squealer cavity.

According to yet another aspect of the invention, a gas turbine engine includes a compressor section, a combustion section, and a turbine section. The turbine section includes a tip portion having a pressure tip wall and a suction tip wall, a tip leading edge and a tip trailing edge. The turbine section also includes a squealer cavity at least partially defined by the pressure tip wall and the suction tip wall. The turbine section further includes a plurality of holes defined by the suction tip wall and located proximate the tip leading edge, the plurality of holes configured to bleed a cooling flow out of the squealer cavity into a hot gas path to reduce pressure within the squealer cavity.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
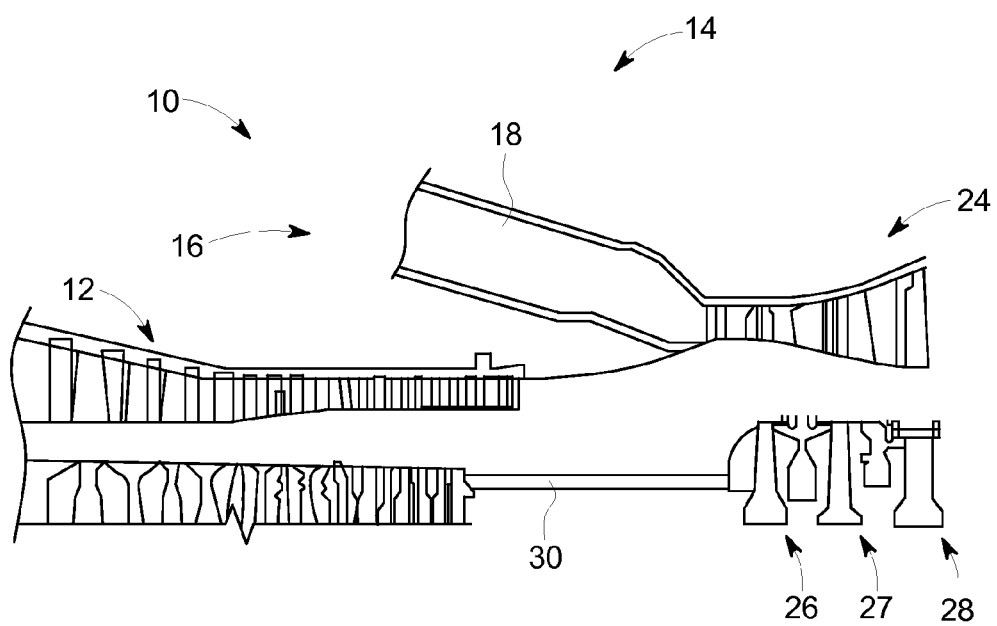
FIG. 1 is a schematic illustration of a gas turbine engine.

Referring to FIG. 1, a turbine system, such as a gas turbine engine 10, constructed in accordance with an exemplary embodiment of the present invention is schematically illustrated. The gas turbine engine 10 includes a compressor section 12 and a plurality of combustor assemblies arranged in a can annular array, one of which is indicated at 14. The combustor assembly is configured to receive fuel from a fuel supply (not illustrated) and a compressed air from the compressor section 12. The fuel and compressed air are passed into a combustor chamber 18 and ignited to form a high temperature, high pressure combustion product or air stream that is used to drive a turbine 24. The turbine 24 includes a plurality of stages 26-28 that are operationally connected to the compressor 12 through a compressor/turbine shaft 30 (also referred to as a rotor).

In operation, air flows into the compressor 12 and is compressed into a high pressure gas. The high pressure gas is supplied to the combustor assembly 14 and mixed with fuel, for example natural gas, fuel oil, process gas and/or synthetic gas (syngas), in the combustor chamber 18. The fuel/air or combustible mixture ignites to form a high pressure, high temperature combustion gas stream, which is channeled to the turbine 24 and converted from thermal energy to mechanical, rotational energy.

Figure 2:
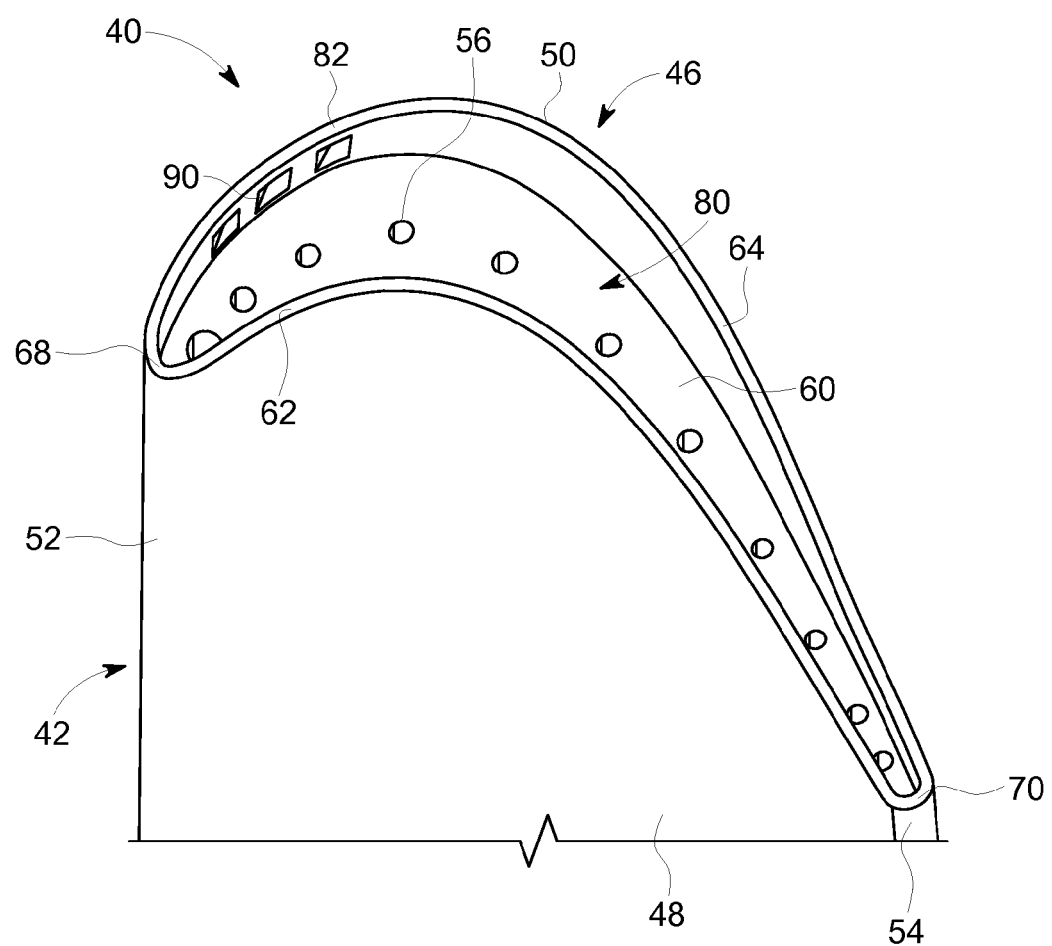
FIG. 2 is a perspective view of a turbine rotor blade of the gas turbine engine according to one aspect of the invention.

Referring now to FIG. 2, with continued reference to FIG. 1, a perspective view of a portion of a turbine rotor blade 40 (also referred to as a "turbine bucket," "turbine blade airfoil" or the like) is illustrated. It is to be appreciated that the turbine rotor blade 40 may be located in any stage of the turbine 24. In one embodiment, the turbine rotor blade 40 is located within the illustrated first stage (i.e., stage 26) of the turbine 24. Although only three stages are illustrated, it is to be appreciated that more or less stages may be present. In any event, the turbine rotor blade 40 includes a main body portion 42 that extends from a root portion (not shown) to a tip portion 46. The main body portion 42 of the turbine rotor blade 40 includes a pressure side wall 48 and a suction side wall 50, where the geometry of the turbine rotor blade 40 is configured to provide rotational force for the turbine 24 as fluid flows over the turbine rotor blade 40. As depicted, the suction side wall 50 is convex-shaped and the pressure side wall 48 is concave-shaped. The main body portion 42 further includes a leading edge 52 and a trailing edge 54. Although the following discussion primarily focuses on gas turbines, the concepts discussed are not limited to gas turbine engines and may be applied to any rotary machine employing turbine blades.

The pressure side wall 48 and the suction side wall 50 are spaced apart in the circumferential direction over the entire radial span of the turbine rotor blade 40 to define at least one internal flow chamber or channel for channeling cooling air through the turbine rotor blade 40 for the cooling thereof. Cooling air is typically bled from the compressor section 12 in any conventional manner. The inside of the turbine airfoil blade 40 may have any configuration including, for example, serpentine flow channels with various turbulators therein for enhancing cooling air effectiveness, with cooling air being discharged through at least one, but typically a plurality of outlet holes 56 located at the tip portion 46 of the turbine rotor blade 40 and, more particularly, proximate a squealer cavity 80 that will be described in detail below in conjunction with the tip portion 46.

Figure 7:
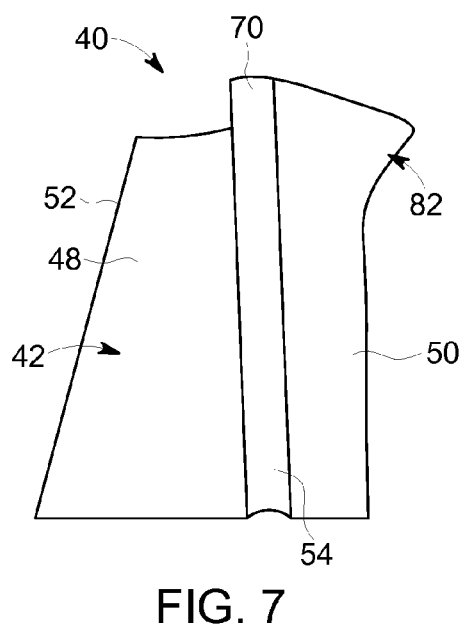
FIG. 7 is a perspective view of the turbine rotor blade illustrating a contoured region of a suction tip wall.

The tip portion 46 includes a tip plate 60 disposed atop the radially outer ends of the pressure side wall 48 and the suction side wall 50, where the tip plate 60 bounds the internal cooling cavities. The tip plate 60 may be integral to the turbine rotor blade 40 or may be welded into place. A pressure tip wall 62 and a suction tip wall 64 may be formed on the tip plate 60. Generally, the pressure tip wall 62 extends radially outwardly from the tip plate 60 and extends axially from a tip leading edge 68 to a tip trailing edge 70. Generally, the pressure tip wall 62 and suction tip wall 64 forms an angle with the tip plate 60 that is approximately 90°, though this may vary. For example, the angular relationship between the pressure tip wall 62 and/or the suction tip wall 64 may be angled from the tip plate 60 at angles other than 90°, such as in the case of a tip winglet or tip fillet 82 on suction surface, as shown in FIG. 7. In the illustrated embodiment, the suction tip wall 64 bulges out in such a way that the angle is not a right angle based on the contoured bulge. Although illustrated on the suction side of the airfoil, it is to be appreciated that as an alternative, or in combination, the pressure tip wall 62 may include a feature that causes it to be angularly oriented at an angle other than 90°. Irrespective of the precise configuration of the pressure tip wall 62 and the suction tip wall 64, the path of pressure tip wall 62 is adjacent to or near the termination of the pressure side wall 48 (i.e., at or near the periphery of the tip plate 60 along the pressure side wall 48).

Figure 3:
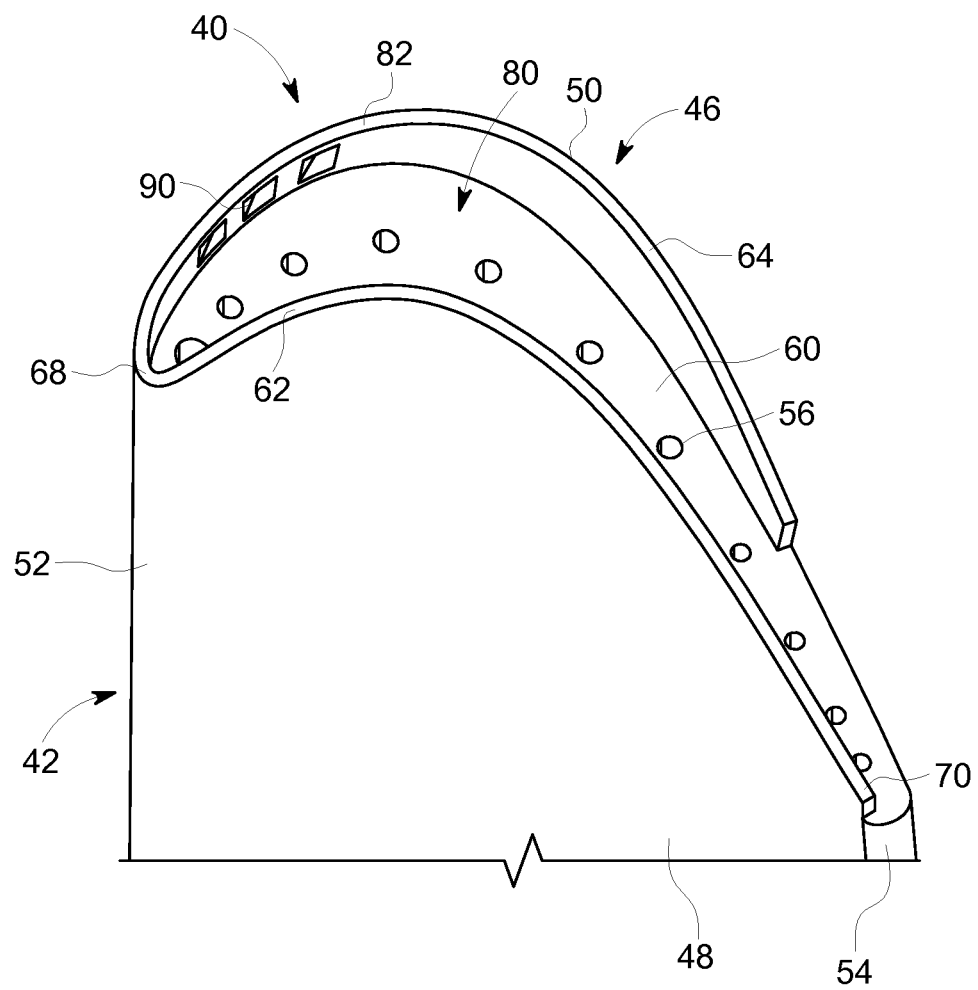
FIG. 3 is a perspective view of the turbine rotor blade according to another aspect of the invention.

Similarly, the suction tip wall 64 generally extends radially outwardly from the tip plate 60 and extends axially from the tip leading edge 68 to the tip trailing edge 70. However, as shown in FIG. 3, the suction tip wall 64 may extend only partially from the tip leading edge 68 to the tip trailing edge 70. The path of the suction tip wall 64 is adjacent to or near the termination of the suction side wall 50 (i.e., at or near the periphery of the tip plate 60 along the suction side wall 50). The height and width of the pressure tip wall 62 and/or the suction tip wall 64 may be varied depending on best performance and the size of the overall turbine assembly. As shown, the pressure tip wall 62 and/or the suction tip wall 64 may be approximately rectangular in cross-sectional shape, although other shapes are also possible.

The pressure tip wall 62 and the suction tip wall 64 generally form what is referred to herein as the squealer cavity 80. The squealer cavity 80 may include any radially inward extending depression or cavity formed on within the tip portion 46. Generally, the squealer cavity 80 has a similar shape or form as the turbine rotor blade 40, though other shapes are possible, and is typically bound by the pressure tip wall 62, the suction tip wall 64, and an inner radial floor, which herein has been described as the tip plate 60.

As described above, in one embodiment the tip portion 46 of the turbine rotor blade 40 includes a winglet or fillet region 82 located along the suction tip wall 64, as shown in FIG. 7. The fillet region 82 may be located anywhere along the length of the suction tip wall 64. The at least one fillet region 82 provides multiple benefits. One benefit associated with the outwardly flared region(s), the tip region leakage is reduced, thereby improving efficiency of the turbine section 24. This is due to weakening of tip leakage vortices proximate the tip portion 46 of the turbine rotor blade 40, which tend to inhibit flow at this region.

To effectively cool the tip portion 46, cooling air is routed through the main body portion 42 and expelled through the plurality of outlet holes 56 into the squealer cavity 80. To reduce the pressure within the squealer cavity 80, thereby lowering the supply pressure needed to effectively provide the cooling air to the squealer cavity 80, at least one, but typically a plurality of holes 90 are included. The plurality of holes 90 is defined by the suction tip wall 64 to form an airway through the suction tip wall 64. The plurality of holes 90 is configured to bleed the cooling air out of the squealer cavity into a hot gas path to reduce the pressure within the squealer cavity 80.

In the illustrated embodiments of FIGS. 2 and 3, the plurality of holes 90 is located proximate the tip leading edge 68 of the suction tip wall 64. In particular, the plurality of holes 90 is located closer to the tip leading edge 68 than the tip trailing edge 70. Such positioning is beneficial based on the higher pressure present near the tip leading edge 68. This higher pressure near the tip leading edge 68 poses a challenge to maintain the required cooling flow through holes (in main body 42) close to leading edge 68. For a given supply pressure at the root of the bucket, reducing cavity pressure (i.e., sink pressure) in this region is desirable which ensures overall cooling of the airfoil near leading edge. However, alternatively or in addition to positioning of the plurality of holes 90 near the tip leading edge 68, the plurality of holes 90 may be located near a mid-point of the suction tip wall 64, as shown in FIGS. 4-6, or proximate the tip trailing edge 70 of the suction tip wall 64.

The plurality of holes 90 may be formed of any suitable geometry. For example, squares or rectangles may be employed, as shown in FIGS. 2, 3 and 6, as well as circles, as shown in FIGS. 4 and 5. It is to be understood that the illustrated and above-noted geometries are not limiting of the shapes that may be employed. For example an ellipse may be used. Regardless of the precise shape of the holes, it is contemplated that the cross-sectional shape of the holes may remain constant throughout the length of the holes or may vary as a function of length. Additionally, as shown, the plurality of holes 90 may extend through the suction tip wall 64 at an angle to enhance the tendency of the cooling air to escape into the hot gas path through the holes. Angling of the holes 90 refers to aligning the holes 90 in such a way that cooling flow coming out of the holes mixes smoothly with the hot gas flowing over the suction surface of the airfoil.

Figure 4:
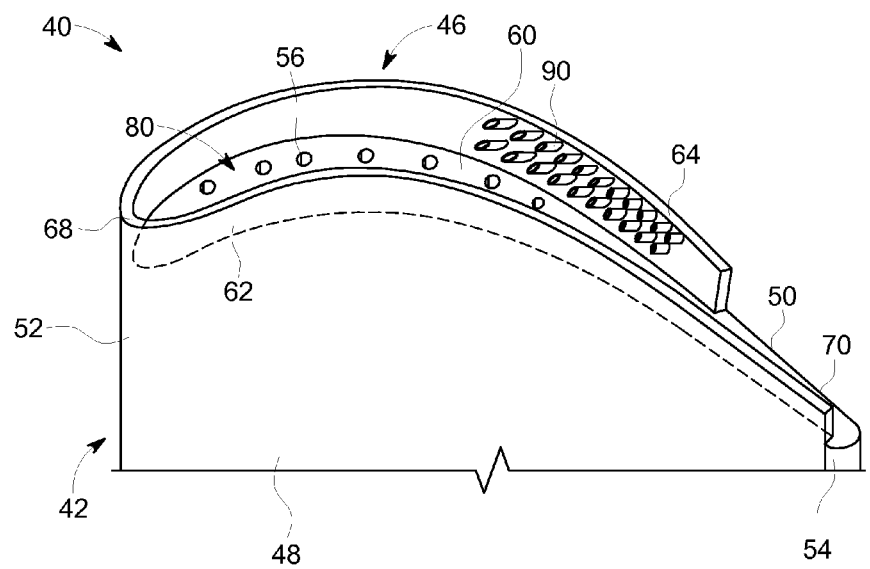
FIG. 4 is a perspective view of the turbine rotor blade according to another aspect of the invention.
Figure 5:
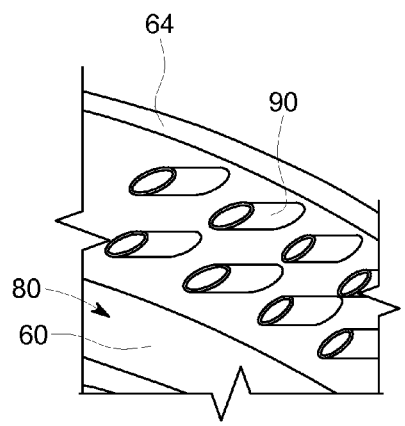
FIG. 5 is an enlarged view of section V of FIG. 4, illustrating a plurality of holes.
Figure 6:
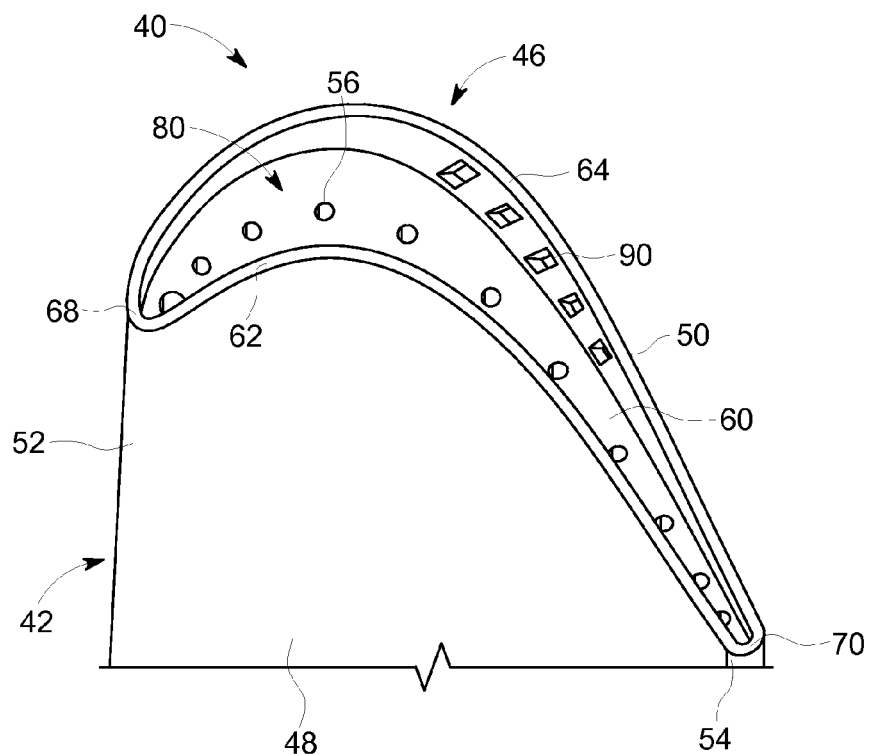
FIG. 6 is a perspective view of the turbine rotor blade according to another aspect of the invention.

The plurality of holes 90 may be arranged in a single row, as shown in FIGS. 2, 3 and 6, or in a plurality of rows, as shown in FIGS. 4 and 5. Irrespective of the precise geometry of the plurality of holes 90 or the arrangement of the holes through the suction tip wall 64, in operation the plurality of holes 90 are configured to bleed the cooling air of the squealer cavity 80 received from the main body portion 42 into the hot gas path to reduce the pressure within the squealer cavity 80. The bleed is made through the suction tip wall 64.

Advantageously, the embodiments described above weaken the tip leakage vortex to decrease the tip leakage flow, thereby reducing losses that directly impact overall turbine system efficiency. By bleeding squealer pocket cooling air through the holes 90 on the suction side squealer wall into hot gas side, a reduction in the pressure in the cavity is achieved as it is in aerodynamic contact with the lower pressure suction side main flow, which helps in keeping a relatively lower supply pressure for the bucket tip cooling circuit. In other words, it helps in improving the back flow margin for the cooling flow supply.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A turbine rotor blade comprising:
   a tip portion having a pressure tip wall and a suction tip wall, a tip leading edge and a tip trailing edge;
   a squealer cavity at least partially defined by the pressure tip wall and the suction tip wall;
   a plurality of holes extending only through the suction tip wall at the leading tip edge, the plurality of holes configured to bleed a cooling flow out of the squealer cavity into a hot gas path to reduce pressure within the squealer cavity; and
   a main body having a suction side wall and a pressure side wall each extending from a root portion of the turbine rotor blade to the tip portion,
   wherein the plurality of holes extends from an internal surface of the suction tip wall to an external surface of the suction tip wall such that the external surface is in-line to the suction side wall.

2. The turbine rotor blade of claim 1, wherein the plurality of holes is located proximate the tip leading edge.

3. The turbine rotor blade of claim 1, wherein the plurality of holes are arranged in a plurality of rows.

4. The turbine rotor blade of claim 1, wherein the plurality of holes are arranged in a single row.

5. The turbine rotor blade of claim 1, wherein the plurality of holes comprises a geometry selected from a group consisting of a circle, a square, a rectangle, and an ellipse.

6. The turbine rotor blade of claim 1, wherein the suction tip wall and the pressure tip wall each extend fully to the tip trailing edge.

7. The turbine rotor blade of claim 1, wherein the suction tip wall partially extends toward the tip trailing edge.

8. The turbine rotor blade of claim 1, further comprising a tip plate that divides the tip portion from the main body.

9. The turbine rotor blade of claim 1, wherein the cooling flow is routed through the main body and expelled into the squealer cavity prior to being partially expelled through the at least one hole of the suction tip wall.

10. A turbine section of a turbine system comprising:
    a plurality of turbine rotor blades forming a plurality of turbine stages, wherein each of the plurality of turbine rotor blades includes a main body having a leading edge, a trailing edge, a suction side wall and a pressure side wall;
    a tip portion of at least one of the plurality of turbine rotor blades having a pressure tip wall and a suction tip wall, a tip leading edge and a tip trailing edge;
    a squealer cavity at least partially defined by the pressure tip wall and the suction tip wall; and
    plurality of holes extending only through the suction tip wall at the leading tip edge, the plurality of holes configured to bleed a cooling flow out of the squealer cavity into a hot gas path to reduce pressure within the squealer cavity,
    wherein the plurality of holes extends from an internal surface of the suction tip wall to an external surface of the suction tip wall such that the external surface is in-line to the suction side wall.

11. The turbine section of claim 10, wherein the plurality of holes is located proximate the tip leading edge.

12. The turbine section of claim 10, wherein the plurality of holes are arranged in a plurality of rows.

13. The turbine section of claim 10, wherein the plurality of holes are arranged in a single row.

14. The turbine section of claim 10, wherein the plurality of holes comprises a geometry selected from a group consisting of a circle, a square, a rectangle, and an ellipse.

15. The turbine section of claim 10, wherein the suction tip wall and the pressure tip wall each extend fully to the tip trailing edge.

16. The turbine section of claim 10, wherein the suction tip wall partially extends toward the tip trailing edge.

17. The turbine section of claim 10, further comprising a tip plate that divides the tip portion from the main body.

18. A gas turbine engine comprising:
    a compressor section;
    a combustion section; and
    a turbine section comprising:
        at least one turbine rotor blade comprising a main body having a leading edge, a trailing edge, a suction side wall, and a pressure side wall;
        a tip portion having a pressure tip wall and a suction tip wall, a tip leading edge and a tip trailing edge;

a squealer cavity at least partially defined by the pressure tip wall and the suction tip wall; and a plurality of holes extending through the suction tip wall and located proximate the tip leading edge, the plurality of holes configured to bleed a cooling flow out of the squealer cavity into a hot gas path to reduce pressure within the squealer cavity, wherein the plurality of holes extend only through the suction tip wall at the leading tip edge from an internal surface of the suction tip wall to an external surface of the suction tip wall such that the external surface is in-line to the suction side wall.

\* \* \* \* \*